United States Patent

Shin et al.

[11] Patent Number: 5,222,924
[45] Date of Patent: Jun. 29, 1993

[54] OVER-DRIVE GEAR DEVICE

[76] Inventors: Chan Shin, 2732-9 Bangbae-Dong, Seocho-Ku, Seoul; Man C. Hur, Chocksuk Apt. Na-Dong 104, Sangpyengsue-Dong, Jinjoo-Shi, Kyunnam-Do, both of Rep. of Korea

[21] Appl. No.: 942,093

[22] Filed: Sep. 8, 1992

Related U.S. Application Data

[63] Continuation of Ser. No. 648,990, Jan. 31, 1991, abandoned.

Foreign Application Priority Data

Jan. 31, 1990 [KR] Rep. of Korea ............... 1047-1990

[51] Int. Cl.⁵ ..................... F16H 1/46; B63H 23/02
[52] U.S. Cl. ................................. 475/329; 475/330; 416/124
[58] Field of Search ............. 475/1, 5, 205, 221, 475/219, 329, 330; 416/124

[56] References Cited

U.S. PATENT DOCUMENTS

| 321,750 | 7/1885 | Pattison | 475/329 |
| 322,796 | 7/1885 | Coffield | 475/329 X |
| 323,725 | 8/1885 | Pattison | 475/329 |
| 333,148 | 12/1885 | Pattison | 475/329 |
| 1,266,518 | 5/1918 | Mulrony | 416/124 |
| 3,861,484 | 1/1975 | Joslin | 475/5 X |
| 3,958,465 | 5/1976 | Hiersig et al. | 475/1 |
| 4,579,019 | 4/1986 | Gabriele | 475/5 |

FOREIGN PATENT DOCUMENTS

| 2334511 | 1/1975 | Fed. Rep. of Germany | 475/329 |
| 3029578 | 2/1982 | Fed. Rep. of Germany | 475/330 |
| 1179163 | 5/1959 | France | 475/1 |
| 2102696 | 4/1990 | Japan | 475/330 |

*Primary Examiner*—Rodney H. Bonck
*Assistant Examiner*—Ryan W. Massey
*Attorney, Agent, or Firm*—Birch, Stewart, Kolasch & Birch

[57] ABSTRACT

An over-drive gear device for use with a wind generator of a windmill, which includes a bevel gear member connected to a rotary shaft of the windmill, first and second vertical axle shafts extending from the bevel gear, an internal gear member connected to the second vertical axle shaft, a planet gear spider connected to the first vertical axle shaft and including a plurality of planet gears, and a sun gear disposed in a geared relationship with the plurality of auxiliary gears, wherein the wind generator is coaxially connected to the main gear and the over-drive gear device effectively increases the total efficiency of the wind generator of the propeller-type windmill.

8 Claims, 5 Drawing Sheets

OVER-DRIVE GEAR DEVICE

This application is a continuation, of application Ser. No. 07/648,990 filed on Jan. 31, 1991, now abandoned.

BACKGROUND OF THE INVENTION

1. Field of the Invention

The present invention relates to an over-drive gear device and more particularly, a high efficient over-drive gear device for use with a wind generator of a propeller-type windmill and the like, which transforms natural energy of wind force to electrical energy by increasing the number of rotations thereof as well as changing the direction of rotary force thereof.

2. Description of the Prior Art

There are two typical types of conventional wind generators in the art, which transform wind energy to electrical energy.

A first type of such conventional wind generators, as shown in FIG. 1, includes an H-type windmill disposed on the top of a steel tower for horizontally rotating and a generator disposed in the steel tower for connecting to a plurality of auxiliary gears disposed in a geared relationship with an axial gear of the windmill so as to increase the number of rotations of the generator. However, such a wind generator has a number of disadvantages such as, for example, difficulty in operating the wind generator and very low efficiency with respect to transforming wind energy into electrical energy.

A second type of such conventional wind generators, as shown in FIG. 2, includes a propeller-type windmill disposed on the top of a steel tower for vertically rotating and a generator having a coaxial rotor for delivering the generated electrical energy from the generator through a slip ring. However, while such a wind generator device has the advantage of abundant electrical energy produced therefrom, it is very expensive to construct the strongly built steel tower so as to support the heavy generator thereon and to install the slip ring facilities.

SUMMARY OF THE INVENTION

Accordingly, it is an object of the present invention to provide an improved over-drive gear device for use in a wind generator.

Another object of the present invention is to provide a compact over-drive gear device for use in a wind generator of a propeller-type windmill system, which is simple in construction, inexpensive to manufacture, and durable in use.

A further object of the present invention is to provide a highly efficient over-drive gear device which can absorb natural energy such as wind energy from a windmill by installing a windmill disposed on the top of a steel tower and a generator disposed in the lower portion of the steel tower, and efficiently converting the horizontal rotations of a shaft of the windmill into vertical rotations of a shaft of the generator.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an over-drive gear device for use with a wind generator of a propeller-type windmill, which comprises a bevel gear member connected to a rotary shaft of the windmill, first and second vertical axle shafts extending from the bevel gear, an internal gear member connected to the second vertical axle shaft, a planet gear spider connected to the first vertical axle shaft and including a plurality of planet gears, and a sun gear disposed in a geared relationship with the plurality of planet gears, wherein the wind generator is coaxially connected to the sun gear and the over-drive gear device effectively increases the total efficiency of the wind generator of the propeller-type windmill.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
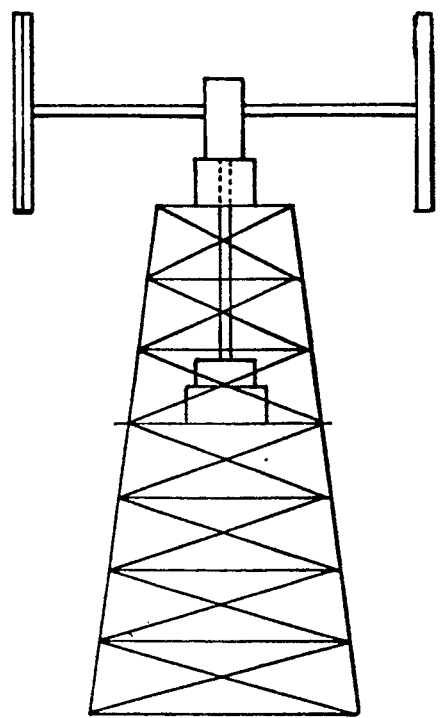
FIG. 1 is a front elevational view of a conventional H-type wind generator.
Figure 2:
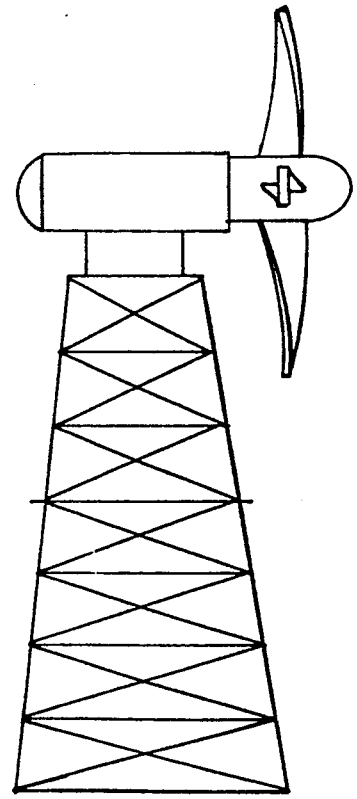
FIG. 2 is a front elevational view of a conventional propeller type wind generator.
Figure 3:
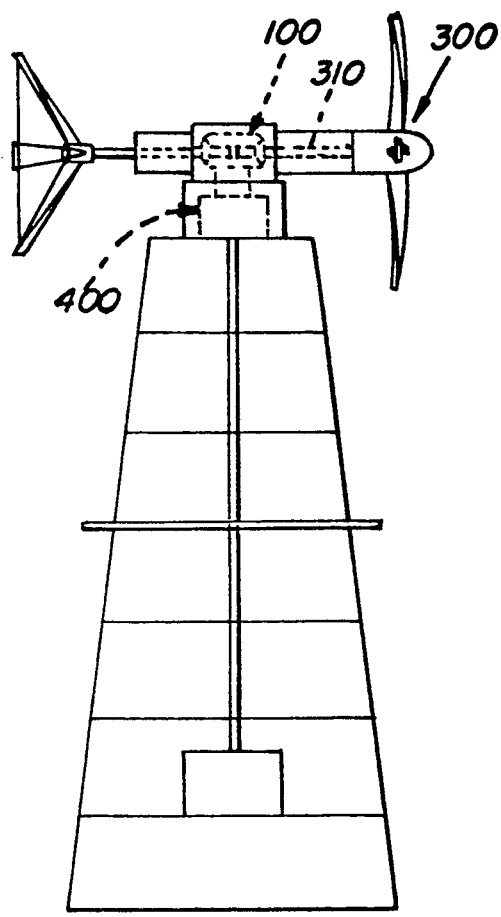
FIG. 3 is a front elevational view of the propeller-type wind generator containing the drive-over gear device according to the present invention.
Figure 4:
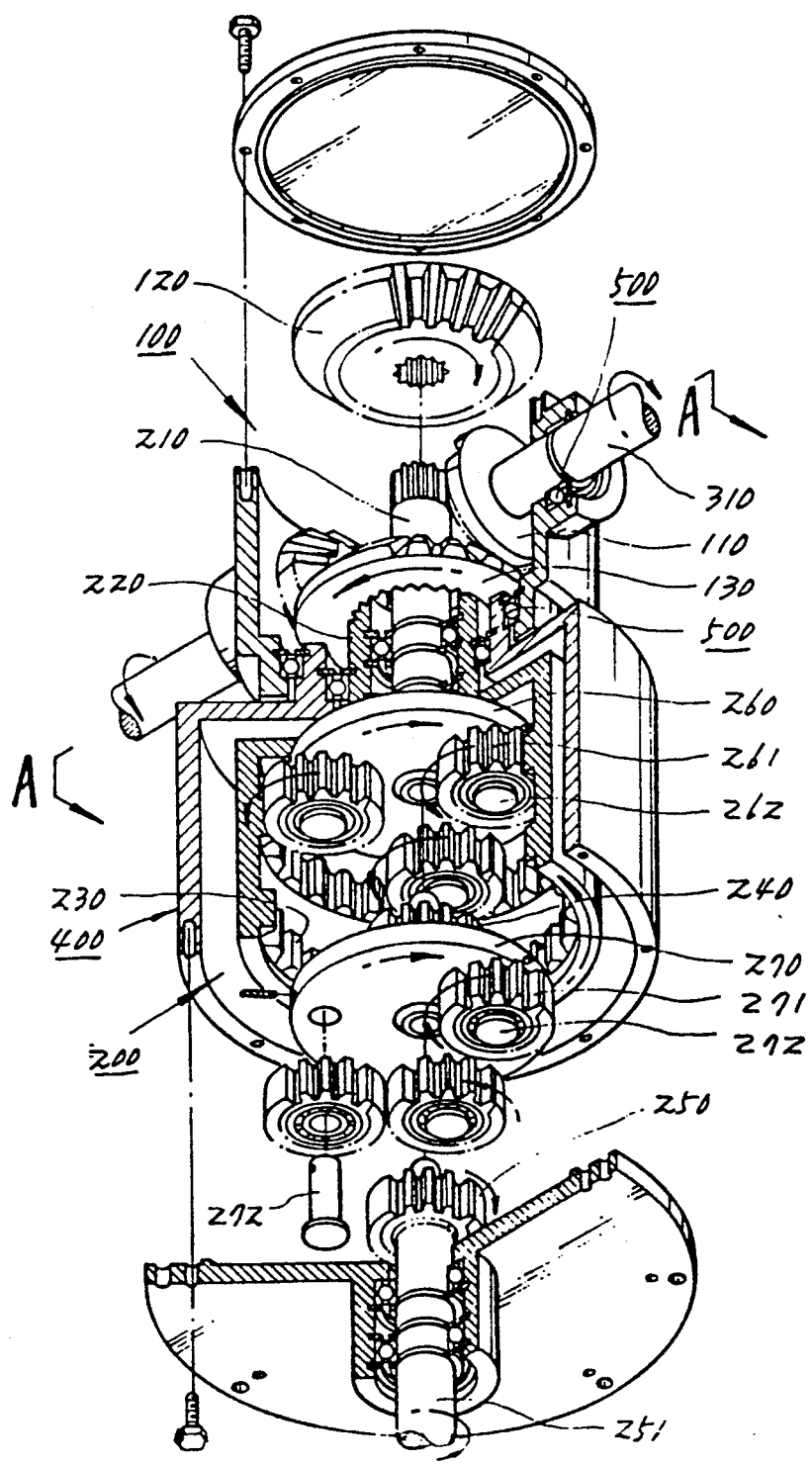
FIG. 4 an enlarged perspective view of the drive-over gear device of the present invention containing cut away portion in order to illustrate the construction of the device according to the present invention.
Figure 5:
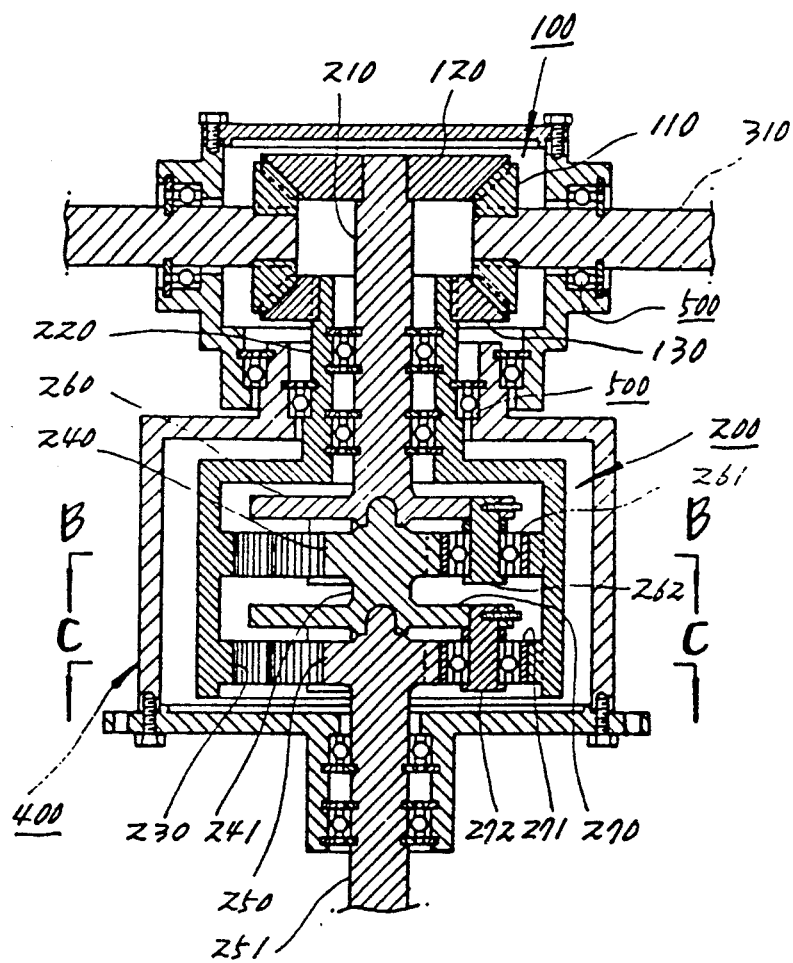
FIG. 5 is a sectional view of FIG. 4, taken along line A—A.
Figure 6:
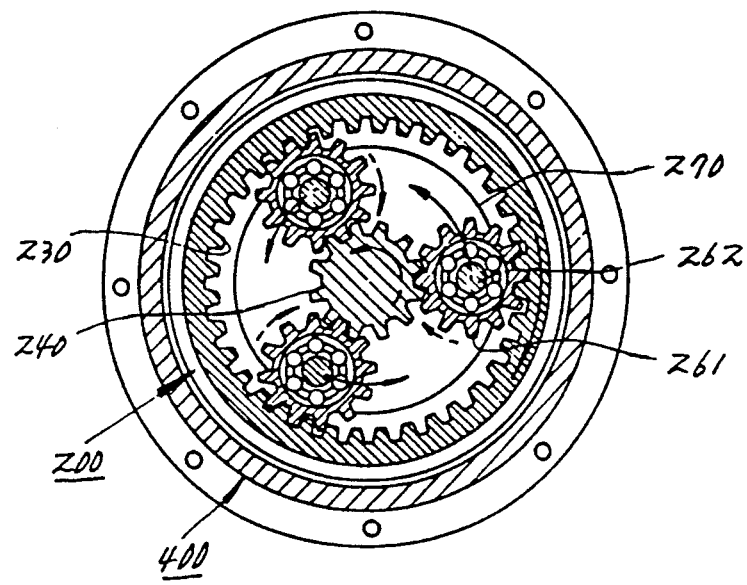
FIG. 6 is a cross-sectional view of FIG. 5, taken along line B—B.
Figure 7:
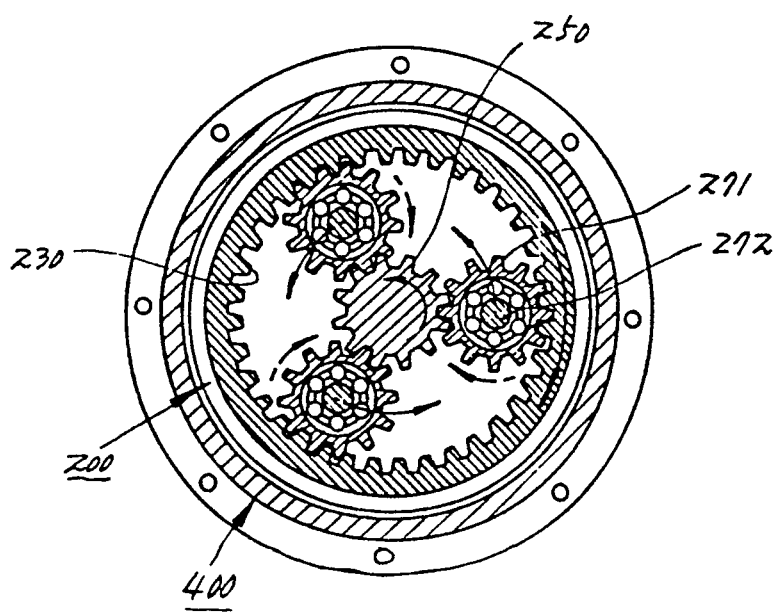
FIG. 7 is a cross-sectional view of FIG. 6, taken along line C—C.

Referring now in detail to the drawings for the purpose of illustrating preferred embodiments of the present invention, the over-drive gear device of the present invention for use in a wind generator and the like as shown in FIGS. 3, 4, and 5, comprises a windmill 300, a pair of rotary shafts 310 of the windmill 300, a bevel gear member 100, a planet gear member 200, and a housing 400.

As shown in FIG. 4, the bevel gear member 100 includes a pair of vertical bevel gears 110, each bevel gear 110 mounted to one end of the rotary shaft 310 of the windmill 300, respectively, an upper horizontal bevel gear 120 perpendicularly disposed in a geared relationship with the upper portion of the vertical bevel gears 110, and a low horizontal bevel gear 130 perpendicularly disposed in a geared relationship with the lower portion of the vertical bevel gears 110, respectively, the windmill containing a plurality of main blades fixed to one vertical bevel gear 110 and a plurality of tail blades fixed to the other thereof (FIG. 3).

The planet gear member 200 disposed within the housing 400 is located under the upper bevel gear 120. Also, the planet gear member 200 includes a first vertical axle shaft 210 having a cylindrical configuration and extending from the upper bevel gear 120, and a second vertical axle shaft 220 having a cylindrical configuration. The second vertical axle shaft 220 extends from the lower bevel gear 130 and rotatably receives the first vertical axle shaft 210 disposed therewithin (FIG. 5). The planet gear member 200 further includes an internal gear member 230 connected to the bottom of the second vertical axle shaft 220 and having a cylindrical configuration and a plurality of internal gears, a first step planet gear spider 260 connected to the upper bevel gear 120 disposed on the top and each first central axis 262 of a plurality of first step planet gears 261 disposed on the bottom thereof, respectively, and a first step sun gear 240 disposed under the center of the first step gear spider 260 and in a geared relationship with three first step planet gears 261, whereby the plurality of first step planet gears 261 revolve about the first central axis 262 thereof and revolve around the first step sun gear 240, and also are geared with the plurality of internal gears of the internal gear member 230, respectively. The plurality of first step planet gears 261 number three.

In addition, referring in detail to FIGS. 4 to 7, there is illustrated a preferred embodiment of the over-drive gear device of the present invention for a wind generator in a windmill which exhibits advantageously enhanced efficiency with respect to producing electrical energy. A second step planet gear spider 270 is located under the first step planet gear spider 260 and is fixed to each second central axis 272 of a plurality of second step planet gears 271 disposed thereunder. The plurality of second step planet gears 271 are disposed in a geared relationship with each other and also are disposed in a geared relationship with the plurality of internal gears of the internal gear member 230. The plurality of second step planet gears 271 number three. A second step sun gear 250 is disposed in a geared relationship with three second step planet gears 271 and also, is rotatably connected to the center of the bottom of the second step planet gear spider 270 at the top thereof and becomes coaxial output shaft 251 of a rotor of the generator. Accordingly, the plurality of second step planet gears 271 revolve about the second central axis 272 thereof and revolve around the second step sun gear 250, and also are geared with the plurality of internal gears of the internal gear member 230, respectively. It is preferred, to include bearings 500 disposed between the rotary shafts 310, the first vertical axle shaft 210, the second vertical axle shaft 220 and the output shaft 251, and the housing 400, respectively.

The over-drive gear device according to the present invention operates as follows.

Firstly, each vertical bevel gear 110 fixed to one end of the rotary shafts 310 of the windmill 300 is stably disposed in a geared relationship with both upper and lower horizontal bevel gears 120 and 130, the force, generally, is directed in the horizontal direction. However, if the windmill 300 is influenced by varying directions of wind, the rotary shafts 310 can easily absorb the force and can immediately transfer the force to the first vertical axle shaft 210 for directing the force in the vertical direction.

Secondly, at this time, although the upper and lower horizontal gears 120 and 130 rotate the same number of times, the rotation direction of the two horizontal gears 120 and 130 is opposite to that of each other. Therefore, rotation forces in opposite directions from the upper and lower horizontal gears 120 and 130 effectively transfer to the first and second axle shafts 210 and 220, respectively.

Thirdly, while the first vertical axle shaft 210 causes the first step planet gear spider 260 to rotate, the second vertical axle shaft 220 causes the internal gear member 230 geared with the first step planet gear 261 to rotate in a direction opposite to the first vertical axle shaft 210. At this time, the number of rotations of the first step planet spider 260 and the internal gear member 230 are the same but they are in opposite directions with respect to each other.

A first step output rotation speed of the second step planet gear spider 270 by the first step sun gear 240 increases when compared with conventional fixed auxiliary gears as follows.

The first output rotation numbers ($Z_{01}$) of the first step sun gear 240 is $$Z_{01} = \left( \frac{ZS_1 + 2ZR_1}{ZS_1} \right) \times n_1, \tag{1}$$

the second output rotation numbers ($Z_{02}$) of the second step sun gear 250 which is connected to the second step planet gears 271 directly connected to the first step sun gear 240 which has the first output rotating numbers ($Z_{01}$) is $$Z_{02} = Z_{01} \times \left( \frac{ZS_2 + ZR_2}{ZS_2} \right), \text{ and} \tag{2}$$

the final output rotation numbers ($Z_{03}$) of the output shaft 251 which has the second output rotation numbers ($Z_{02}$), $$Z_{03} = Z_{02} + \left( \frac{ZR_2}{ZS_2} \right) \times n_2. \tag{3}$$

In conclusion, the total output rotation numbers ($Z_0$) of the overdrive gear device according to the present invention is $$Z_0 = \left[ \left\{ \left( \frac{ZS_1 + 2ZR_1}{ZS_1} \right) \times n_1 \right\} \times \left( \frac{ZS_2 + ZR_2}{ZS_2} \right) \right] \times \left( \frac{ZR_2}{ZS_2} \right) \times n_2,$$

wherein $ZS_1$ represents the number of teeth of the first step sun gear 240, $ZR_1$ represents to the number of teeth of the upper internal gear member 230, $ZS_2$ represents the number of teeth of the second step sun gear 250, $ZR_2$ represents the number of lower internal gear members 230, $n_1$ is the input rotations of the first and second vertical axle shafts 210 and 220, and $n_2$ the input rotations of the internal gear member 230.

Thus, one embodiment of the present invention is the above-described double auxiliary gear unit. Other embodiments of the present invention may include triple or quadruple auxiliary gear units.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An over-drive gear device for use with a wind generator of a propeller-type windmill, which comprises:

a bevel gear member including a pair of vertical bevel gears, each vertical bevel gear being mounted on one end of each of a pair of horizontal rotary windmill shafts of said windmill respectively, an upper horizontal bevel gear being perpendicularly disposed in a geared relationship with an upper option of said vertical bevel gears, and a lower horizontal bevel gear being perpendicularly disposed in a geared relationship with a lower portion of said vertical bevel gears, said upper and lower horizontal bevel gears rotating oppositely with respect to each other, one of said horizontal rotary windmill shafts having a plurality of main blades fixed to one a plurality of tail blades fixed to one end of the other horizontal windmill shaft;

a first vertical axle shaft and a second vertical axle shaft extending from said upper horizontal bevel gear and said lower horizontal bevel gear, respectively, said first and second vertical axle shafts having a cylindrical configuration, respectively, said second vertical axle shaft rotatably receiving said first vertical axle shaft therewithin;

an internal gear member formed on an inner peripheral bottom surface of said second vertical axle shaft, said internal gear member having a plurality of internal gears disposed a first and second heights therewithin;

a first step planet gear spider connected to said first vertical axle shaft at a bottom portion thereof and centered within said second vertical axle shaft, said first step planet gear spider including at least one first gear shaft positioned adjacent an outer perimeter thereof, at least one first step planet gear being rotatable about said at lest one first gear shaft beneath said first step planet gear spider, said at least one first step planet gear being disposed in a geared relationship with said internal gear member at the second height thereof;

an intermediate vertical axle shaft positioned directly beneath and axially aligned with said first vertical axle shaft and rotatable in an opposite direction with respect thereto;

a first step sun gear positioned at an upper end of said intermediate vertical axle shaft and in axial alignment therewith, said first step sun gear being disposed in a geared relationship with said at least one first step planet gear;

a second step planet gear spider connected to a lower end of said intermediate vertical axle shaft and centered within said second vertical axle shaft, said second step planet gear spider including at least one second gear shaft positioned adjacent an outer perimeter thereof, at least one second step planet gear being rotatable about said at least one second gear shaft beneath said second step planet gear spider, said at least one second step planet gear being disposed in a geared relationship with said internal gear member at the first height thereof;

an output shaft axially aligned with said first vertical shaft and said intermediate vertical axle shaft and rotatable in an opposite direction with respect to said intermediate vertical axle shaft; and a second step sun gear positioned at an upper end of said output shaft and in axial alignment therewith, said second step sun gear being disposed in a geared relationship with said at least one second step planet gear;

said first and second vertical axle shafts rotating oppositely and at identical speeds according to a speed of rotation of said pair of horizontal rotary windmill shafts, said intermediate vertical axle shaft rotating at a second speed according to input to said first step sun gear by said first step planet gear spider and said at lest one first step planet gear, and said output shaft rotating at a third speed according to input to said second step sun gear by said second step planet gear spider and said at least one second step planet gear, wherein eh third speed is greater than the second speed and the second speed is greater than the first speed.

2. The over-drive gear device of claim 1, wherein the lower horizontal bevel gear, the second vertical axle, the internal gear, a first step planet gear spider, and the first step sun gear are disposed within a housing, said housing being provided with bearings disposed between the rotary windmill shaft, the first vertical axle shaft, the second vertical axle shaft, and the first step sun gear shaft, and the housing, respectively.

3. The over-drive gear device according to claim 1, wherein said at least one first step planet gear numbers three.

4. The over-drive gear deice of claim 1, wherein said at least one second step planet gear numbers three.

5. The over-drive gear device of claim 1, wherein a first step output rotation speed of said first step sun gear is $$Z_{01} = \left(\frac{ZS_1 + 2ZR_1}{ZS_1}\right) \times n_1, \quad (1)$$

where $ZS_1$ is a number of teeth in said step sun gear, $ZR_1$ is a number of teeth of the second height of said internal gear member, and $n_1$ is a number of input rotations of said first and second vertical axle shafts.

6. The over-drive gear device of claim 5, wherein a second step output rotation speed of said second step sun gear is $$Z_{02} = Z_{01} \times \left(\frac{ZS_2 + ZR_2}{ZS_2}\right), \text{ and} \quad (2)$$

where $ZS_2$ is a number of teeth of said second step sun gear, and $ZR_2$ is a number of teeth of the first height of said internal gear member.

7. The over-drive gear device of claim 6, wherein a rotation of speed of said output shaft is $$Z_{03} = Z_{02} + \left(\frac{ZR_2}{ZS_2}\right) \times n_2 \quad (3)$$

where $n_2$ is a number of input rotations of said internal gear member.

8. The over-drive gear device of claim , wherein an output rotation of said over-drive gear device is $$Z_0 = \left[\left\{\left(\frac{ZS_1 + 2ZR_1}{ZS_1}\right) \times n_1\right\} \times \left(\frac{ZS_2 + ZR_2}{ZS_2}\right)\right] \times$$

$$\left(\frac{ZR_2}{ZS_2}\right) \times n_2$$

where $ZS_1$ is a number of teeth in said first step sun gear, $ZR_1$ is a number of teeth of the second height of said internal gear member, $n_1$ is a number of input rotations of said first and second vertical axle shafts, $ZS_2$ is a number of teeth of said second step sun gear, $ZR_2$ is a number of teeth of said internal gear member, and $n_2$ is a number of input rotations of said internal gear member.

* * * * *